Patented Jan. 11, 1944

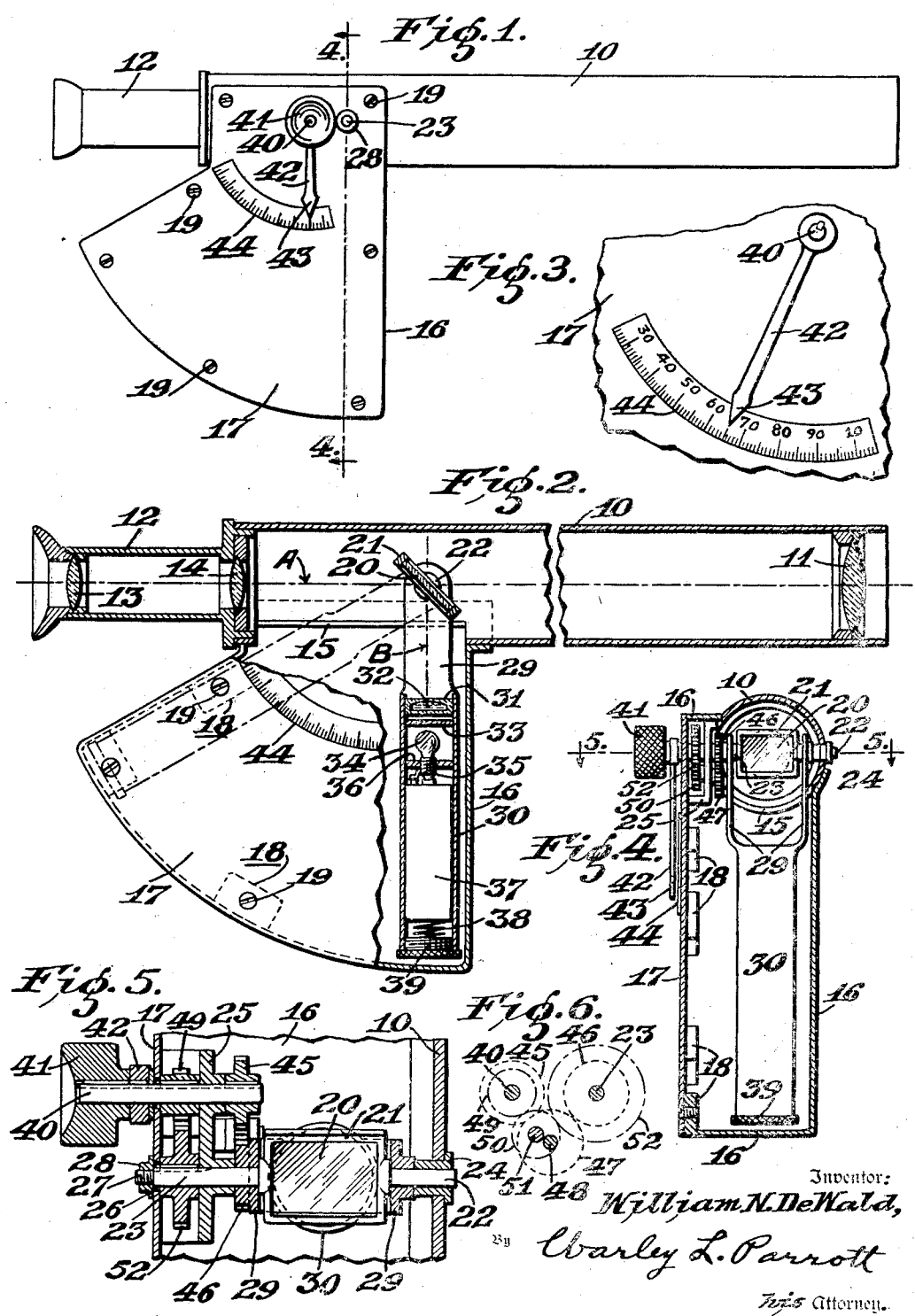

2,339,004

UNITED STATES PATENT OFFICE 2,339,004

OPTICAL MEASURING INSTRUMENT

William N. De Wald, Miami, Fla.

Application October 5, 1942, Serial No. 460,912

3 Claims. (Cl. 88—2.4)

This invention relates to astronomical and other angle-measuring instruments and more particularly to an octant or a sextant type of device for use in marine and aerial navigation.

The prime object of the invention is to simplify the construction and arrangement of such instruments so as to not only minimize difficulties in and cost of manufacture but to also make for easy manipulation and elimination of confusion in use, without detracting from the requisite efficiency and accuracy in reckoning.

The particular advantages of the present invention will appear more fully and specifically in the following description of the illustrative, practical, construction and arrangement of an octant as shown in the accompanying drawing, in which:

Fig. 1 is a side elevation;

Fig. 2 is a view, on an enlarged scale, partially foreshortened, and in partial longitudinal section and side elevation, to show more clearly certain interior details of construction;

Fig. 3 is a fragmentary view, in front elevation, to illustrate a practical indicator scale and correlated pointer;

Fig. 4 is a section on the line 4—4 of Fig. 1;

Fig. 5 is a fragmentary sectional view taken on the line 5—5 of Fig. 4 and on an enlarged scale; and, Fig. 6 is a diagrammatic view illustrating the arrangement and ratio of the gear assembly shown in Figs. 4 and 5.

Referring now to the drawing in detail, the numeral 10 designates, generally, the optical finder or telescope portion of the instrument. This portion of the instrument, except for the parts of the present invention that are incorporated to function therein and therewith, may be of any conventional structure suitable for the purpose. As shown, the optical finder 10 includes the objective lens 11 and the eyepiece 12 provided with an outer lens 13 and an inner lens 14.

For the purposes of the present invention, the body tube of the optical finder 10 is cut away on its under and one side portion, for some distance adjacent the eyepiece 12 as at 15 (see Figs. 2 and 4). Depending from the optical finder 10, beneath this cutaway portion 15, is a sector-shaped housing 16 provided with a removable coverplate 17 as one side wall thereof. As shown more clearly in Figs. 2 and 4, the housing 16 is provided with internal lugs 18 to which the coverplate 17 is fastened by screws 19.

Disposed transversely of the body tube of the optical finder 10 above the cutaway portion 15 thereof, is a transparent mirror 20. This mirror as shown (see Figs. 4 and 5) is mounted within a frame 21 having a trunnion 22 at one side and a somewhat longer trunnion 23 at its opposite side (shown more clearly in Fig. 5).

The trunnion 22 is journalled in a bearing element 24 inserted (fixedly in any approved manner) in an opening provided therefor in the wall of the body tube of the optical finder 10. The other trunnion 23 is extended through and has its intermediate portion journalled in a supporting bracket or gear-carrier-frame 25 that is attached to the top wall portion of the housing 16 (see Fig. 4). The outer end portion of this trunnion 23 is projected through an aperture 26 in the cover-plate 17 of the housing 16, and it is screw-threaded, as at 27, for the reception of a nut 28 that covers the aperture 26 (see Fig. 5).

Mounted freely rotatable on the trunnions 22 and 23 are the opposed bifurcations or yoke extensions 29 of a hollow, cylindrical, pendulum-like shell 30. This element 30 has a transparent bubble-holder 31 secured in its top portion. The holder 31 contains a characteristic liquid in which there is a conventional bubble 32 that always finds a position centrally of the holder 31 and coincident with the longitudinal axis of the pendulum shell 30 when the latter is hanging vertically from the trunnions 22 and 23 (see Fig. 2).

Just beneath the bubble-holder 31 is a translucent partition 33, which may be a disk of ground glass or any other suitable material. Under this element 33 is an electric light bulb 34, the socket 35 for which is fitted centrally in a partition or other suitable transverse support 36 provided for the purpose in the pendulum shell 30. Below the light bulb support 36 is an electric dry battery 37. The pole terminals of the battery are held in electrical contact with the conventional terminals of the light bulb socket 35 by a spring element 38 that is compressed against the lower end of the battery by a screw-plug or other suitable type of cap element 39 of the pendulum shell 30 (see Fig. 2).

The light from the bulb 34 in the arrangement of the several elements thereabove in the pendulum shell 30 illuminates the bubble 32 and projects an image of the same onto the mirror 20.

Any suitable switch (not shown) can be obviously provided and applied in any conventional manner for turning the light in the bulb 34 on and off at will. The same per se does not enter directly into the present invention. Hence, it is deemed unnecessary to illustrate it in detail in the drawing.

When the optical finder 10 is horizontal and the pendulum shell 30 vertically pendant, as shown in Fig. 2, the axial line of sight A of the finder and the axial line of bubble image projection B from the pendulum shell are at right angles, i. e., ninety degrees (90°) apart from each other. Considering this the normal relative positions of the finder and pendulum shell, the transparent mirror 20 is set normally at an angle of forty-five degrees (45°) or, in other words, at one half (½) the angle between the finder line of sight A and line of bubble image projection B, as shown in Fig. 2. So, too, the pivotal axis of the mirror 20 is diametric of the finder tube and also coincident with the point of intersection of the said lines of sight and bubble image projection A and B, respectively.

The relative one-half angularity of the mirror 20 with respect to the angularity of the intersecting lines of sight and bubble image projection A and B is maintained by proportionate ratio adjustment of the mirror throughout the use of the instrument. That is to say, when the optical finder 10 is trained on any particular object (in marine or aerial navigation, usually a star or other celestial body) it is more often tilted at an inclination from the horizontal and generally with its forward end raised. Therefore, provision is made in accordance with the present invention for adjusting the pendulum shell 30 to a vertical position and at the same time proportionately adjusting the mirror to the aforesaid one-half angularity relative to the established angularity between the lines of sight and bubble image projection. A simple yet practical and highly efficient adaptation of the invention for this purpose will now be described.

As hereinbefore stated, the upper bifurcated portions or yoke extensions 29 of the pendulum shell 30 are hinged freely rotatable on the trunnions 22 and 23 of the mirror frame 21. Now, to mechanically swing said pendulum shell on said trunnions and to hold it in its adjusted position, at the same time in unison with an angularity indicator, an actuator and controller shaft 40 is located laterally from the mirror trunnion 23 and provided with an external manipulating knob 41 by which it is conveniently rotated.

A pointer 42, provided with a hub portion at its upper end, is keyed or otherwise fastened on the shaft between the knob 41 and the cover-plate 17 of the housing 16 (see Figs. 4 and 5). The pointer, in its normal position shown in Fig. 1, extends vertically downward from the shaft 40, with its pointed end portion 43 in register with the 90° mark on an arcuate scale 44 on the outer face of the cover-plate 17.

The scale 44 as shown in Fig. 3 is marked off in radial lines indicative of degrees and numbered in multiples of ten, the 90° indication being, of course, directly vertical below the axis of the shaft 40. The other numbers to the left of the 90° indication are decreasingly numbered down to the 30° indication. The 10° indication to the right of the 90° indication may be marked "10" as shown, or, obviously, it may be marked "100." However, the particular marking of the scale 44 may be varied, if desired.

The pointer 42 as thus mounted rotates with the shaft 40. To move the pointer and the pendulum shell 30 in unison and at the same angularity a toothed gear wheel 45 is keyed or otherwise fastened on the inner end portion of the shaft 40. This wheel 45 drives a toothed wheel 46 of the same pitch diameter, fixed or formed integrally on the hub portion of the adjacent yoke extension 29 of the pendulum shell 30. This driving is through the intermediary of an interposed idler wheel 47, also of the same pitch diameter and rotatable on a jackshaft 48, as shown more clearly by the dotted-line circles in the diagram in Fig. 6. The ratio of this particular gear assembly is 1 to 1. Hence, the swinging movement of the pointer 42 and the pendulum shell 30 is equal.

To rock the mirror 20 through one-half the angle of swing of the pointer 42 and the pendulum shell 30, a pinion 49 of smaller pitch diameter than that of the respective wheels 45, 46 and 47 is keyed or otherwise fastened on the actuator and controller shaft 40 between the supporting bracket or gear-carrier-frame 25 and the cover-plate 17 (see Fig. 5). This pinion 49 is in mesh with an interposed idler pinion 50, of the same pitch diameter, rotating on a jackshaft 51. The idler pinion 50 is in turn in mesh with a toothed gear wheel 52 of a pitch diameter double that of said pinion 50. The wheel 52 is keyed or otherwise fastened on the trunnion 23 of the mirror frame 21. The ratio of this gear assembly of the two pinions 49 and 50 of the same diameter and the wheel 52 of double that diameter, as shown by dot-and-dash lines in Fig. 6, is 2 to 1, i. e., each of the pinions 49 and 50 makes two revolutions to one of the wheel 52. Hence, the mirror 20 is rocked through an angle only one-half that of the swing of the pointer 42 and the pendulum shell 30.

In accordance with the present invention, the gearing between the actuator and controller shaft 40 and the mirror 20 and the pendulum element 30 may be varied as to form and type for accomplishing the proportionate actuation and control of said parts.

In the use of the octant illustrated in the drawing and as herein described, the observer trains the optical finder or telescope 10 directly on the particular star or celestial body sought for a reckoning. Upon accomplishing this he turns the knob 41, which in turn actuates the respective chains of gears, until the pendulum-like element 30 is vertically positioned so that the bubble 32 is coincident with the longitudinal axis of the element 30. The bulb 34 having previously been lighted the image of the bubble 32 is projected onto the axial portion of the mirror 20 where the axial line of sight A of the optical finder 10 intersects the pivotal axis of the mirror and the line B of bubble image projection. At this time the pointer 42 is brought into registration with the mark on the arcuate scale 44 indicative of the angle of inclination of the optical finder 10 relative to the vertically positioned pendulum element 30.

At the same time the mirror 20 has been adjusted to an angle one-half that of the angle between the axial line of sight A of the finder 10 and the line of bubble image projection B from the element 30. For example, when the finder 10 is horizontal as shown in Figs. 1 and 2, and the knob 41 has been manipulated to set the pendulum element 30 in vertical position and at right angles to the finder 10, the mirror 20 is brought to the 45° angle shown in Fig. 2, which is one-half the 90° angle between the intersecting longitudinal axes of the finder and the pendulum element.

By the same token, should the finder 10 be inclined, the pendulum element 30 is accordingly positioned vertically by manipulation of the knob 41 as aforesaid. The pointer 42 is at the same time positioned to indicate the relative angularity of the instrument so as to attain the desired reckoning with accuracy sufficient for navigation of marine and air craft.

By the use of an instrument constructed, arranged and manipulated in accordance with the present invention, navigation reckonings are readily and conveniently attained without confusion. This is principally because of the direct sighting of the object sought through the telescope or optical finder 10 and the exceedingly simple yet highly efficient provision of the rockable transparent mirror 20 with the actuating and controlling means which sets the mirror at the proportionate half angle when the adjustment of the bubble carrier pendulum 30 is effected.

While the illustrative form and arrangement of instrument as shown and herein described embodies a practical and efficient adaptation of the present invention considerable alteration and modification thereof is contemplated within the scope of the appended claims. The invention, therefore, is not limited to the specific details of construction and arrangement shown.

I claim:

1. An instrument of the character described, comprising a tubular, direct-observance, optical finder having a conventional eyepiece at one end and an objective lens forward thereof, a transparent mirror pivotally mounted within the finder tube and disposed transversely of the same between the eyepiece and the objective lens, the pivotal axis of the mirror being substantially medial thereof and coincident with the longitudinal line of sight of the finder, the under and one lower side portion of the finder tube being cut away in the immediate region of the transparent mirror and continuing between the mirror and the eyepiece, a closed housing shell covering said cutaway portion but communicably therethrough and extending downwardly from the finder tube, a swingable pendulum-like bubble-carrier-element depending into said closed housing shell from a support co-axially with the axis of the mirror, the longitudinal axis of said bubble-carrier-element intersecting the line of sight of the finder coincident with the axis of the mirror, a bubble located in a transparent holder within said carrier-element whereby the bubble is centered in the holder and coincident with the longitudinal axis of the carrier-element when the latter is positioned vertically to intersect the finder line of sight at various angular positions of the finder, illuminable means below the bubble-holder in said carrier-element for projecting an image of the bubble upwardly along the longitudinal axis of said element and onto the mirror at the point of intersection, and commonly manipulated means enclosed within said housing shell but having an external manipulating element for positioning the bubble-carrier-element vertically, whatever may be the angular position of the finder-tube, and for simultaneously tilting the mirror adjustably in proportionately varied relation to the change in angularity between the line of sight in the finder-tube and the intersecting longitudinal axis of the bubble-carrier-element.

2. The structure as set forth in claim 1 and further describing, more specifically, the actuating and controlling means for the bubble-carrier-element and the mirror as comprising a gear assembly including an actuator and controller shaft having an external manipulating knob fastened thereon, a driving pinion fastened on said shaft, a driven spur wheel, of twice the pitch-diameter of said pinion, secured co-axially to the mirror, an interposed idler pinion of the same pitch diameter as said first mentioned pinion and intermeshed therewith and with said spur wheel whereby each pinion makes two revolutions to one of the spur wheel and the mirror is rocked through an angle half that of knob rotation, an additional gear chain including a driving spur wheel fastened on said actuator and controller shaft, a driven spur wheel secured to the bubble-carrier-element coaxially with the pivotal axis of support of said element, an idler spur wheel intermeshed with said driving and driven spur wheels, said three mentioned wheels being of the same pitch-diameter whereby the bubble-carrier-element is made to swing through an angle equal to that of knob rotation, said gearing and parts mentioned in association with the wheels being located within the adjacent portion of the finder-tube and the housing shell attached to and depending from said tube in intercommunication therewith, an arcuate scale on the outside of the housing shell, and a pointer fastened on said actuator shaft externally of the housing shell with its pointed end in cooperatively opposed relation to said arcuate scale, said pointer moving in unison with and in parallel relation to the bubble-carrier-element to indicate on the scale the angular position of said element relative to the finder-tube.

3. In an instrument of the character described, a tubular optical finder having an eyepiece and an objective lens forward thereof, a pivoted, transparent mirror having supporting trunnions at opposite sides, the axis of the trunnions being diametric of the finder-tube and intermediate the eyepiece and objective lens and intersecting the line of sight of the finder, the under and one lower side portion of the finder-tube being cut away and a housing extension being provided on the tube to cover the cutaway portion, a pendulum-like bubble-carrier-element suspended freely rotatable on the mirror trunnions with its longitudinal axis intersecting the finder line of sight coincident with the point of intersection of the trunnion axis, an actuator and controller shaft located laterally from the mirror, a manipulating knob on said shaft, a "1 to 1" ratio driving connection between said actuator and controller shaft and said bubble-carrier-element, a "2 to 1" driving connection between said shaft and said mirror, an arcuate scale on the outside of said housing, and a pointer element on said actuator and controller shaft having its pointed end in cooperative indicating relation to said arcuate scale.

WILLIAM N. DE WALD.